US011364959B1

(12) United States Patent
Boe et al.

(10) Patent No.: US 11,364,959 B1
(45) Date of Patent: Jun. 21, 2022

(54) MODULAR ROBOTIC VEHICLE

(71) Applicant: One3 Design, Inc., Cedar Falls, IA (US)

(72) Inventors: Thomas Cedric Boe, Cedar Falls, IA (US); Parker Wells, Polk City, IA (US); Zachary Kooistra, Cedar Falls, IA (US); Forrest Beeler, West Des Moines, IA (US); Kyle Boe, Cedar Falls, IA (US); Louis Macuch, Waynesboro, GA (US); Broc Ducharme, Harlem, GA (US); Terry Zwart, Loveland, CO (US)

(73) Assignee: Amos Power, Inc., Cedar Falls, IA (US)

( * ) Notice: Subject to any disclaimer, the term of this patent is extended or adjusted under 35 U.S.C. 154(b) by 0 days.

(21) Appl. No.: 17/562,847

(22) Filed: Dec. 27, 2021

(51) Int. Cl.
| | | |
|---|---|---|
| *B62D 55/084* | (2006.01) | |
| *B62D 55/125* | (2006.01) | |
| *B62D 55/32* | (2006.01) | |
| *B62D 55/10* | (2006.01) | |

(52) U.S. Cl.
CPC .......... *B62D 55/084* (2013.01); *B62D 55/10* (2013.01); *B62D 55/125* (2013.01); *B62D 55/32* (2013.01)

(58) Field of Classification Search
CPC ...... B62D 55/32; B62D 55/04; B62D 55/075; B62D 55/084; B62D 55/13; B62D 63/025; B62D 65/02; B62D 65/04; B62D 11/04; B62D 55/10
USPC ........................................................ 475/154
See application file for complete search history.

(56) References Cited

U.S. PATENT DOCUMENTS

| | | | |
|---|---|---|---|
| 4,060,310 A | 11/1977 | Brown | |
| 4,326,549 A | 4/1982 | Hinding | |
| 4,541,051 A | 9/1985 | Jarret | |
| 4,873,475 A | 10/1989 | Togo | |
| 5,035,158 A | 7/1991 | Leigh-Monstevens | |
| 5,101,922 A | 4/1992 | Ohmura | |
| 5,365,283 A | 11/1994 | Doherty | |
| 5,456,333 A | 10/1995 | Brandt | |
| 5,492,192 A | 2/1996 | Brooks | |

(Continued)

FOREIGN PATENT DOCUMENTS

| | | | | |
|---|---|---|---|---|
| CN | 109398516 | * | 3/2019 | ......... B62D 55/0847 |
| CN | 113548122 | * | 10/2021 | ........... B62D 55/084 |

(Continued)

OTHER PUBLICATIONS

CN 109398516 to Jiang, English translation (Year: 2018).*

(Continued)

*Primary Examiner* — Anne Marie M Boehler
(74) *Attorney, Agent, or Firm* — Shuttleworth & Ingersoll, PLC; Jason R. Sytsma

(57) ABSTRACT

A robotic vehicle with modular track assemblies that are separable from the chassis with the drive unit being self-contained in each track assembly with the motor controller, and the coolant system being enclosed in an ornamental cover all of which is positioned above the track and with a cooler of the coolant system being positioned rearward of the motor and the motor controller and a gear box connected outside the ornamental cover on the inside of the left track assembly to couple the motor to a final drive that drives the track with the motor being positioned above the final drive.

17 Claims, 16 Drawing Sheets

(56) References Cited

U.S. PATENT DOCUMENTS

| | | |
|---|---|---|
| 5,529,028 A | 6/1996 | Weikert |
| 5,652,487 A | 7/1997 | Nishino |
| 5,657,099 A | 8/1997 | Doherty et al. |
| 5,751,579 A | 5/1998 | Hrovat |
| 5,951,115 A | 9/1999 | Sakai |
| 6,108,193 A | 8/2000 | Haberstroh |
| 6,119,802 A | 9/2000 | Puett |
| 6,154,702 A | 11/2000 | Fodor |
| 6,219,607 B1 | 4/2001 | Piepenbrink |
| 6,298,941 B1 | 10/2001 | Spadafora |
| 6,305,506 B1 | 10/2001 | Shirai |
| 6,577,025 B2 | 6/2003 | Hentschel |
| 6,717,281 B1 | 4/2004 | Brandon |
| 6,727,669 B2 | 4/2004 | Suzuki |
| 6,874,592 B2 | 4/2005 | Yokotani |
| 6,978,856 B2 | 12/2005 | Nakamura |
| 7,032,981 B2 | 4/2006 | Frey |
| 7,104,364 B2 | 9/2006 | Godlewsky |
| 7,185,745 B2 | 3/2007 | Godlewsky |
| 7,201,384 B2 | 4/2007 | Chaney |
| 7,347,803 B2 | 3/2008 | Kobayashi |
| 7,351,182 B2 | 4/2008 | Kobayashi |
| 7,902,987 B2 | 3/2011 | Lemasson |
| 7,950,481 B2 * | 5/2011 | Betz .................... B60K 6/46 180/6.44 |
| 7,954,960 B2 | 6/2011 | Shirai |
| 8,083,245 B2 | 12/2011 | Hatzikakidis |
| 8,193,650 B2 | 6/2012 | Thorne |
| 8,197,077 B2 | 6/2012 | Brouwer |
| 8,246,120 B2 | 8/2012 | Bourqui |
| 8,288,979 B2 | 10/2012 | Bates |
| 8,413,752 B2 | 4/2013 | Page |
| 8,466,578 B2 | 6/2013 | Ackert |
| 8,467,929 B2 | 6/2013 | Bechtler |
| 8,494,699 B2 | 7/2013 | Bourqui |
| 8,500,289 B2 | 8/2013 | Shibasaki |
| 8,657,057 B2 * | 2/2014 | Bolz ................... B62D 21/186 180/312 |
| 8,684,115 B2 | 4/2014 | Bryant |
| 8,714,292 B1 | 5/2014 | Wong |
| 8,717,156 B2 | 5/2014 | Tronnier |
| 9,061,592 B2 | 6/2015 | Meng |
| 9,061,680 B2 | 6/2015 | Dalum |
| 9,085,302 B2 | 7/2015 | Borroni-Bird |
| 9,199,609 B2 | 12/2015 | Rasal |
| 9,221,451 B2 | 12/2015 | Ahn |
| 9,302,667 B2 | 4/2016 | Tassinger |
| 9,308,964 B2 | 4/2016 | Saida |
| 9,481,263 B2 | 11/2016 | Ebert |
| 9,561,767 B2 | 2/2017 | Darraba |
| 9,561,779 B2 | 2/2017 | Rasal |
| 9,615,497 B2 | 4/2017 | Bassett |
| 9,947,148 B2 | 4/2018 | Moellmann |
| 10,029,571 B2 | 7/2018 | Ito |
| 10,093,308 B2 | 10/2018 | Sugai |
| 10,104,824 B2 | 10/2018 | Blackwell |
| 10,259,498 B2 | 4/2019 | Jegenstedt |
| 10,322,769 B2 | 6/2019 | Tanaka |
| 10,379,532 B2 | 8/2019 | Cameron |
| 10,458,402 B2 | 10/2019 | Yan |
| 10,562,381 B2 | 2/2020 | Haubs |
| 10,562,400 B2 | 2/2020 | Ryu |
| 10,589,738 B1 | 3/2020 | Boecker |
| 10,659,707 B2 | 5/2020 | Oka |
| 10,734,878 B2 | 8/2020 | Kim |
| 10,788,043 B2 | 9/2020 | He |
| 10,793,084 B2 | 10/2020 | Jiang |
| 10,814,889 B2 | 10/2020 | Looney |
| 10,858,041 B2 | 12/2020 | Jegenstedt |
| 10,889,341 B2 * | 1/2021 | Warr .................... B60K 7/0007 |
| 10,946,856 B2 | 3/2021 | Oyama |
| 10,980,173 B2 | 4/2021 | Becke |
| 11,021,158 B2 | 6/2021 | Mueller |
| 2006/0076168 A1 * | 4/2006 | Gaudreault ............ B62D 55/32 180/9.1 |
| 2008/0223279 A1 * | 9/2008 | Koskinen ................ E02F 9/024 114/267 |
| 2009/0295222 A1 * | 12/2009 | Scheetz .................. B62D 55/14 305/125 |
| 2011/0005847 A1 * | 1/2011 | Andrus .................... F41H 11/16 180/9.1 |
| 2014/0048344 A1 * | 2/2014 | Canfield ............... B62D 55/075 180/9.5 |
| 2014/0288763 A1 * | 9/2014 | Bennett ................ B62D 55/244 180/9.5 |
| 2015/0105965 A1 | 4/2015 | Blackwell |
| 2016/0096548 A1 * | 4/2016 | Tigue ....................... H02K 7/14 180/6.7 |
| 2016/0096563 A1 * | 4/2016 | Tigue .................... B62D 11/04 29/401.1 |
| 2018/0043932 A1 * | 2/2018 | Borud ................... B62D 55/10 |
| 2020/0031408 A1 * | 1/2020 | Di Biase ................ B62D 55/10 |
| 2021/0223772 A1 | 7/2021 | Penmetsa |
| 2022/0033017 A1 * | 2/2022 | Dockerty ............... B62D 55/06 |

FOREIGN PATENT DOCUMENTS

| | | | |
|---|---|---|---|
| WO | WO-2008073990 A2 * | 6/2008 | ............. B62D 55/04 |
| WO | 2020106142 | 5/2020 | |
| WO | 2020106143 | 5/2020 | |
| WO | 2020152123 | 7/2020 | |
| WO | 2021146478 | 7/2021 | |
| WO | 2021146493 | 7/2021 | |
| WO | 2021146510 | 7/2021 | |

OTHER PUBLICATIONS www.ztractor.com—Print screen dated Nov. 15, 2021, ZTRACTOR, Palo Alto, CA.

www.AgXeed.com—Print screen dated Nov. 15, 2021, AgXeed, Oirlo, The Netherlands.

https://www.monarchtractor.com/mkv.html—Print screen dated Nov. 15, 2021, Zimeno Inc dba Monarch Tractor, Livermore, CA.

https://i.ytimg.com/vi/qcYR2XaD0UA/maxresdefault.jpg—photo of AgXeed tractor.

* cited by examiner

MODULAR ROBOTIC VEHICLE

TECHNICAL FIELD

This disclosure relates to autonomous vehicles and, more specifically, to modular tracked robotic vehicles.

BACKGROUND INFORMATION

There are many instances where autonomous vehicles are preferred to human-operated vehicles. Such autonomous vehicles are particularly advantageous for performing dangerous tasks or operating in hazardous conditions, akin to what first responders or explosive ordinance disposal teams may experience. They are also favorable in situations where large fleets are needed, such as in agriculture, where farms have increased in size but the limited window of time for agricultural operations remains the same. No matter the situation, personnel need autonomous vehicles that are readily available and robust enough to operate in all conditions.

Therefore, there is a need in the art for a method, system, and/or apparatus that can aid persons in completing various operations. The method, system, and/or apparatus can be used to reduce the time for completing operations, improve the conditions in which an operation can be completed, reduce the amount of manpower needed, or otherwise reduce the number of issues associated with farming and other industries.

SUMMARY

In accordance with one aspect of the present invention, disclosed is a robotic vehicle with modular, detachable, replaceable, and configurable track assemblies. In one implementation, a robotic vehicle comprises a chassis comprising a right side and a left side with a right track assembly separable from the right side of the chassis and a left track assembly separable from the left side of the chassis, wherein each of the right track assembly and the left track assembly comprise a motor operably connected to a track. In this arrangement, the respective track assemblies are detachable, replaceable, and configurable from the chassis of the robotic vehicle so that robotic vehicle can be configured as dual track or single-track robotic vehicle with the motor, motor controller, and the coolant system being self-contained in each track assembly.

Each of the right track assembly and the left track assembly can comprise track equipment, including a track frame, a track link combined to the track to rotate with the track, a sprocket engaged with the track link to rotate the track link and the track, at least one idler roller and at least one roller engaged with the track link to maintain an alignment of the track as well as distribute the weight of the track assembly across the track, and a final drive is combined to the sprocket and driven by the motor to rotate the track with respect to the track frame.

In order to keep each modular track assembly compact, each of the right track assembly and the left track assembly further comprises a gearbox assembly comprising the motor positioned vertically above the final drive. In this regard, an axis of rotation for an output of the motor is positioned above an axis of rotation of the final drive to elevate the motor above the ground to keep the motor out of dirt. A brake can also be connected to the gearbox on the opposite side of the motor and the final drive to arrest the rotation of the output of the motor, the final drive or both the motor and the final drive.

Such a compact arrangement of the gear box can be found do to the unique assembly of the gear box, which can house a motor gear mechanically coupled to the motor, a brake gear mechanically coupled to the brake and counter-rotationally engaged with the motor gear, and final drive gear mechanically coupled to the final drive and counter-rotationally engaged with the brake gear, wherein each of the motor gear, the brake gear, and the final drive gear can have an axis of rotation all of which can be aligned on a vertical plane.

More specifically, the gear box can comprise of a front gear box plate and a rear gear box plate spaced apart by a center gear box plate, wherein the motor gear is coupled to the motor by a motor shaft assembly that is substantially housed in a motor shaft housing that is attached to the outside of the front gear box plate and to the motor, wherein the brake gear is coupled to the brake by a brake shaft assembly that is substantially housed in a brake shaft housing that is attached to the outside of the rear gear box plate and to the brake, and wherein the final drive gear is coupled to the final drive by a final drive shaft assembly that is housed in a final drive shaft housing that is attached to the outside of the front gear box face and to the final drive. This arrangement allows the overall thickness of the gearbox measured from the front gearbox plate to the rear gearbox plate to be relatively thin on the order of a few inches thick.

Each of the right track assembly and the left track assembly of the robotic vehicle can also advantageously have a motor controller electrically connectable to a battery unit and electrically connected to the motor for converting power from the battery unit to power for the motor. With the motor controller positioned in the modular track assembly, it can simply be connected to the central unit of the robotic vehicle by a detachable electrical connector. This keeps the motor and the motor controller in each track assembly. In an embodiment, the motor is an AC motor and the motor controller converts power from the battery unit to a variable frequency AC power for the motor. A DC motor with an appropriate motor controller can also be used depending on the situation.

It is also advantageous that each of the right track assembly and the left track assembly comprises its own coolant system operably connected to the motor controller and the motor for dissipating heat from the motor controller and the motor. The coolant system can comprise of a cooler and a pump for circulating coolant around the controller and the motor to the cooler, and wherein the controller is positioned between the motor and the pump. In order to keep each track assembly modular and compact, the coolant system and the motor controller can be positioned above the track. With a cooler positioned rearward of the motor and the final drive.

Different configurations of the respective track assemblies are also contemplated. Each of the right track assembly and the left track assembly can comprise a track frame and an attachment mechanism to removably attach the track frame to the chassis. In one implementation, the attachment mechanism comprises a pair of tubes combined to the track frame and slidingly combined to the chassis with an actuator combined to the chassis and attached to at least one tube of the pair of tubes to drive the track frame towards and away from the chassis to increase or decrease a track-to-track width of the robotic vehicle. This is especially useful for agricultural operations with row width can change. In another implementation, the attachment mechanism can comprise a pair of angle arms attached at one end to the track frame and attached to the other end to the chassis to elevate the chassis above the ground and increase a track-to-track width of the robotic vehicle.

In either implementation of the attachment mechanism, the left track assembly is separable from the chassis by disconnecting the attachment mechanism from the chassis and disconnecting an electrical connector. With these few disconnections, each track assembly along with its own self-contained motor, motor controller, and coolant system being fully separable with the track assembly from the operating unit and the battery unit.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
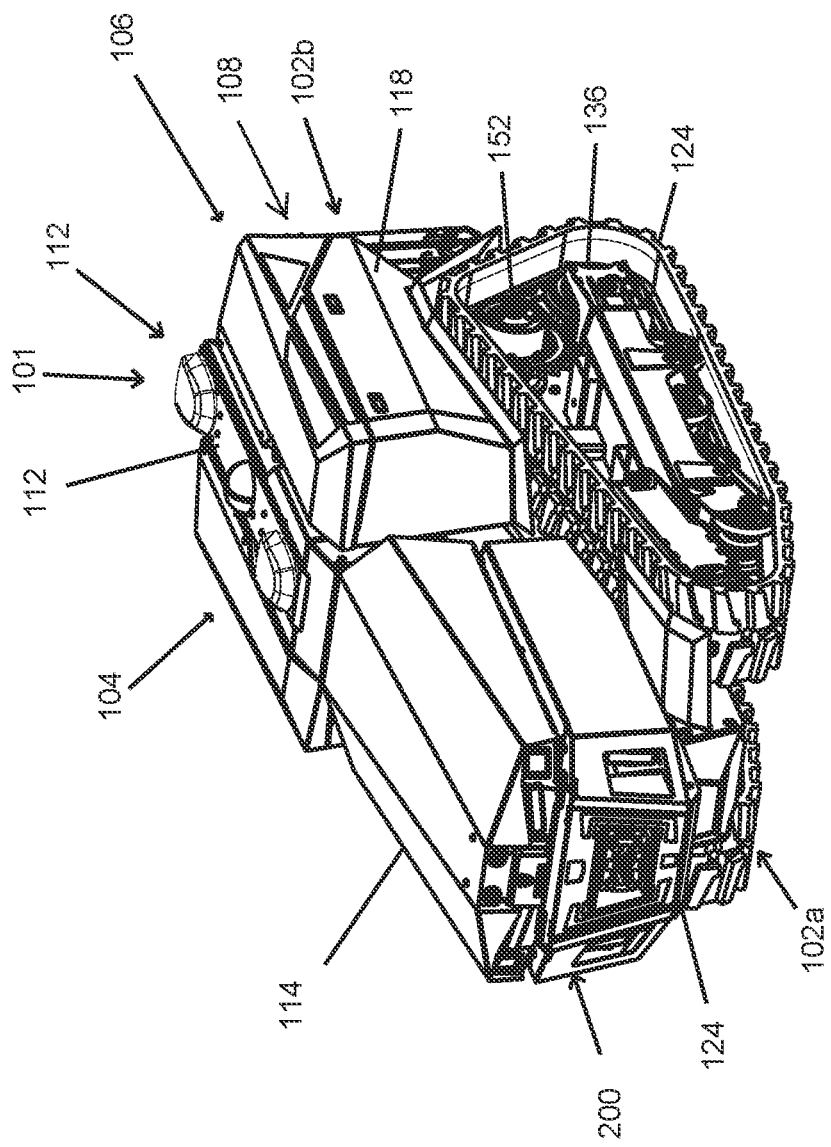
FIG. 1 is a perspective view of a robotic vehicle according to this disclosure.

FIG. 1 is a perspective view of a robotic vehicle 100 according to this disclosure. Robotic vehicle 100 is electric driven, and remotely operable, in order to carry out manpower-intensive or high-risk functions without exposing an operator to fatigue or hazard. Robotic vehicle 100 is robust and sturdy to operate in challenging environments. Its low, forward center of gravity allows for towing or hauling equipment many times its weight. With an easily replaceable battery pack, robotic vehicle 100 can operate for many hours then quickly exchange battery packs for continued operation.

Robotic vehicle 100 comprises of a central unit 101 with a chassis 102 having a front end 102a and rear end 102b supported on a right track assembly 104 and a left track assembly 106. Each right track assembly 104 and left track assembly 106 has its own motor drive that is removably connectable to an operating unit 112, where the circuitry and software necessary for operating robotic vehicle 100 is located. A front hood 114 projects outward from operating unit 112 of central unit 101 and each motor drive assembly 108 where ancillary equipment such as cameras 111 and lights 113 can be located.

Beneath front hood 114, on chassis 102, and between right track assembly 104, and left track assembly 106, is a battery unit 200. Battery unit 200 may approach 25-30% of the total weight of robotic vehicle 100 weighing more than 1,500 pounds. By positioning battery unit 200 underneath front hood 114 on chassis 102, the center of gravity of robotic vehicle 100 is lowered and moved forward to improve traction and towing capacity. Battery unit 200 and chassis 102 are described more fully in counterpart U.S. patent application Ser. No. 17/526,872 filed on Nov. 15, 2021 the contents of which are hereby incorporated by reference herein.

Figure 12:
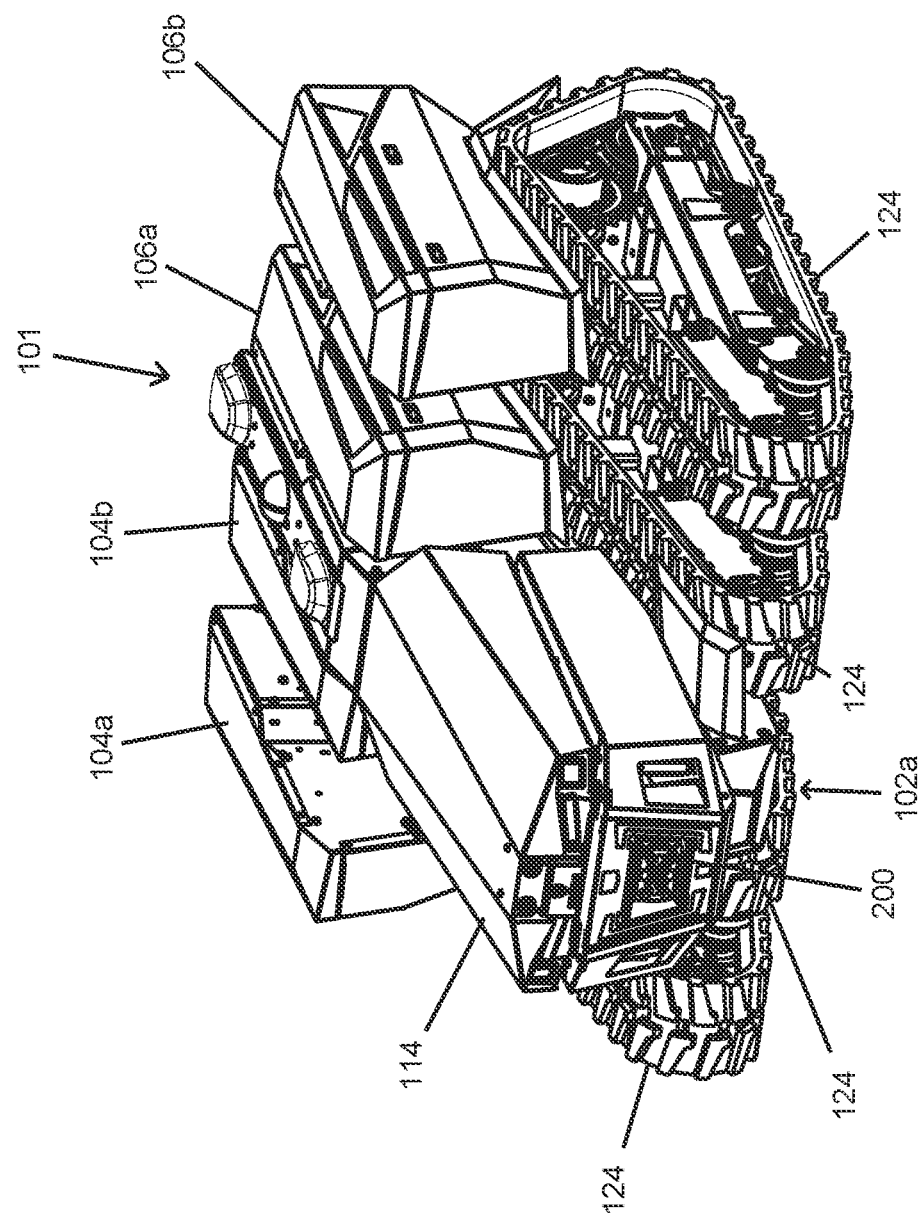
FIG. 12 is a perspective view of the robotic vehicle of FIG. 6 with dual track assemblies units.

Robotic vehicle 100 comprises right track assembly 104 and left track assembly 106 that are each removably attachable from chassis 102 of central unit 101 of robotic vehicle 100 to make robotic vehicle 100 easily configurable for various applications. FIGS. 1-4 show one implementation with right track assembly 104 and left track assembly 106 having a standard width and ground clearance, while FIGS. 6-9 show another implementation with a greater width and ground clearance by merely exchanging a frame attachment mechanism 120, discussed below. In addition, robotic vehicle 100 can include two or more right track assemblies 104 and left track assemblies 106, such as the implementation shown in FIG. 12 with dual track assemblies units comprising right track assemblies 104a, 104b and left track assemblies 106a, 106b, when greater towing capacity is required.

Figure 2:
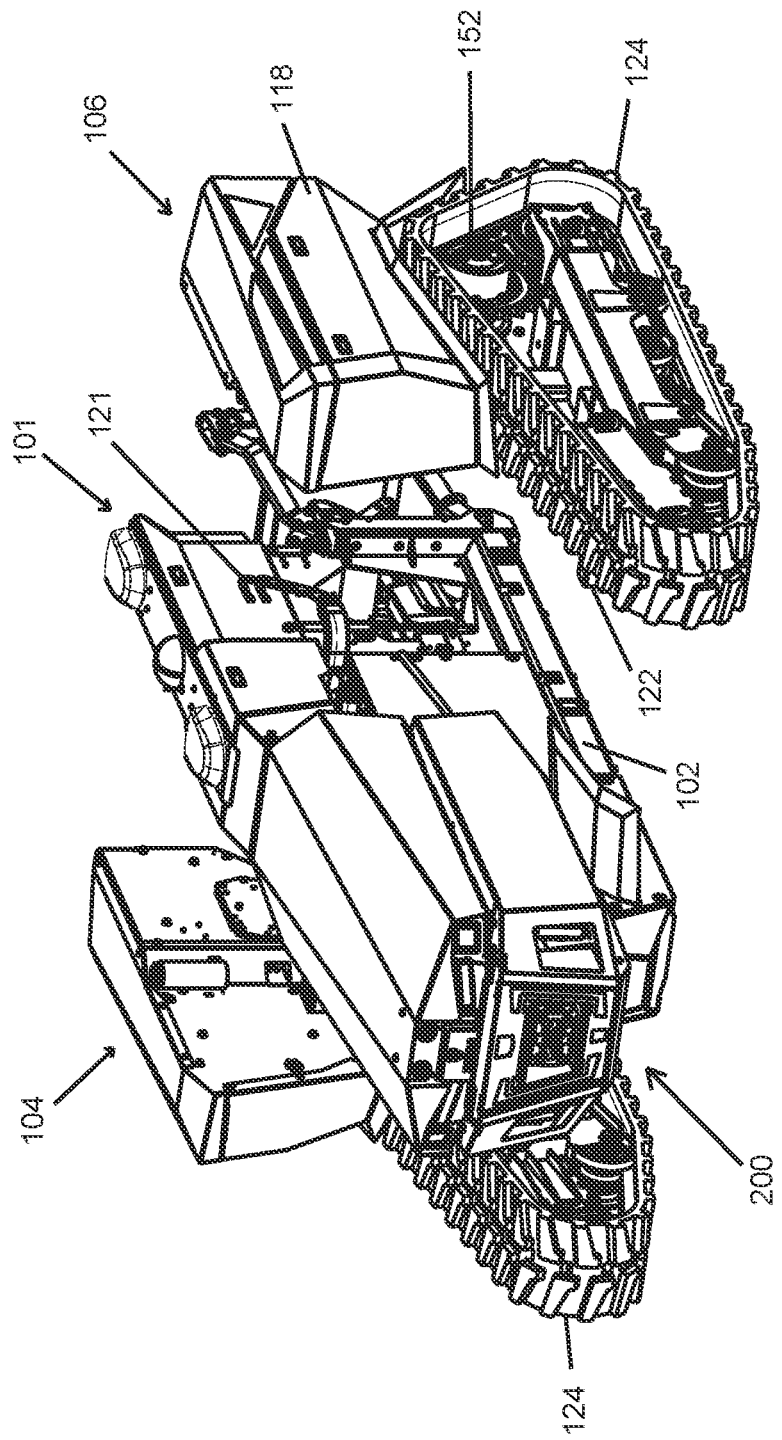
FIG. 2 is a perspective view of the robotic vehicle of FIG. 1 with the track assemblies detached from the operating unit.

Turning to FIG. 2, shown are the right track assembly 104 and left track assembly 106 detached from chassis 102 of central unit 101. As can be seen, each right track assembly 104 and left track assembly 106 is a modular self-contained unit that is easily separable from chassis 102 of central unit 101 with the only connections being frame attachment mechanism 120, shown in FIGS. 4, 7, and 17-18, to removably combine the respective right track assembly 104 and left track assembly 106 to chassis 102 and an electrical connector 121 for power from battery unit 200 and data to and from operating unit 112.

Figure 4:
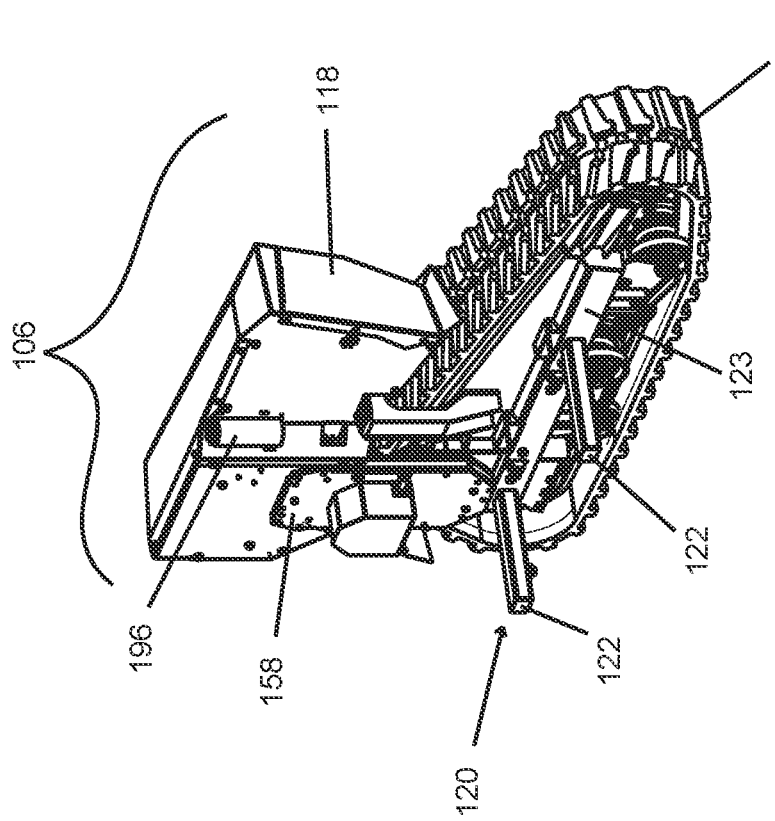
FIG. 4 is a perspective view of the inside of the left track assembly of FIG. 1.
Figure 3:
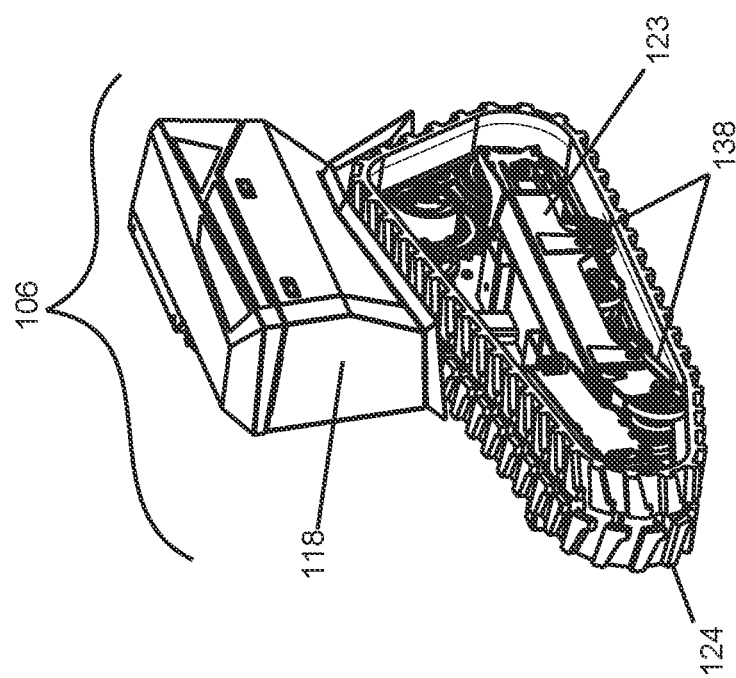
FIG. 3 is a perspective view of outside of the left track assembly of FIG. 1.

FIG. 3 shows a perspective view of outside of the left track assembly 106 of FIG. 1 and FIG. 4 shows a perspective view of the inside of the left track assembly 106. Because right track assembly 104 is functionally the same with the same components only mirrored, only left track assembly 106 will be described with the understanding that right track assembly 104 is similarly constructed.

Figure 5:
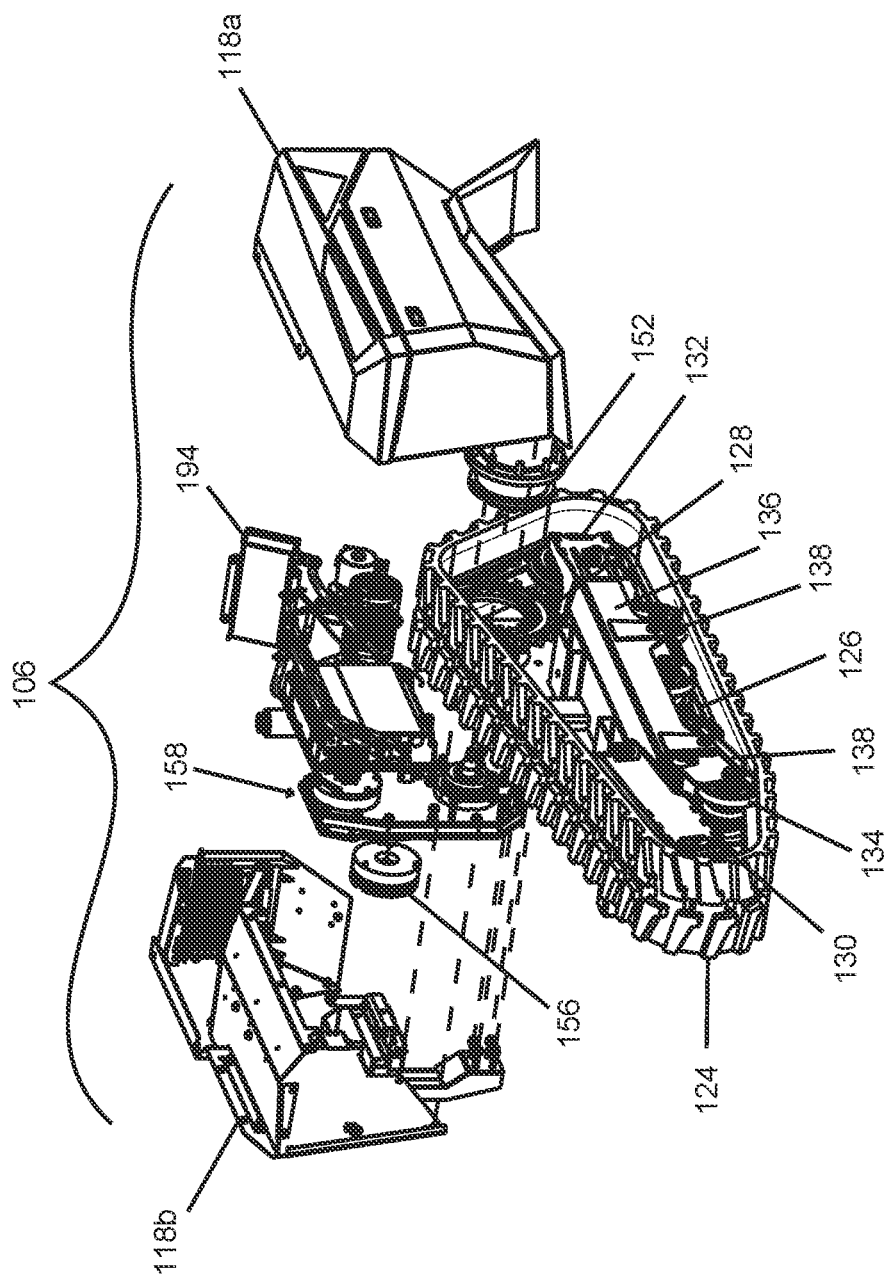
FIG. 5 is an exploded view of the operating unit of the left track assembly of FIG. 1.
Figure 6:
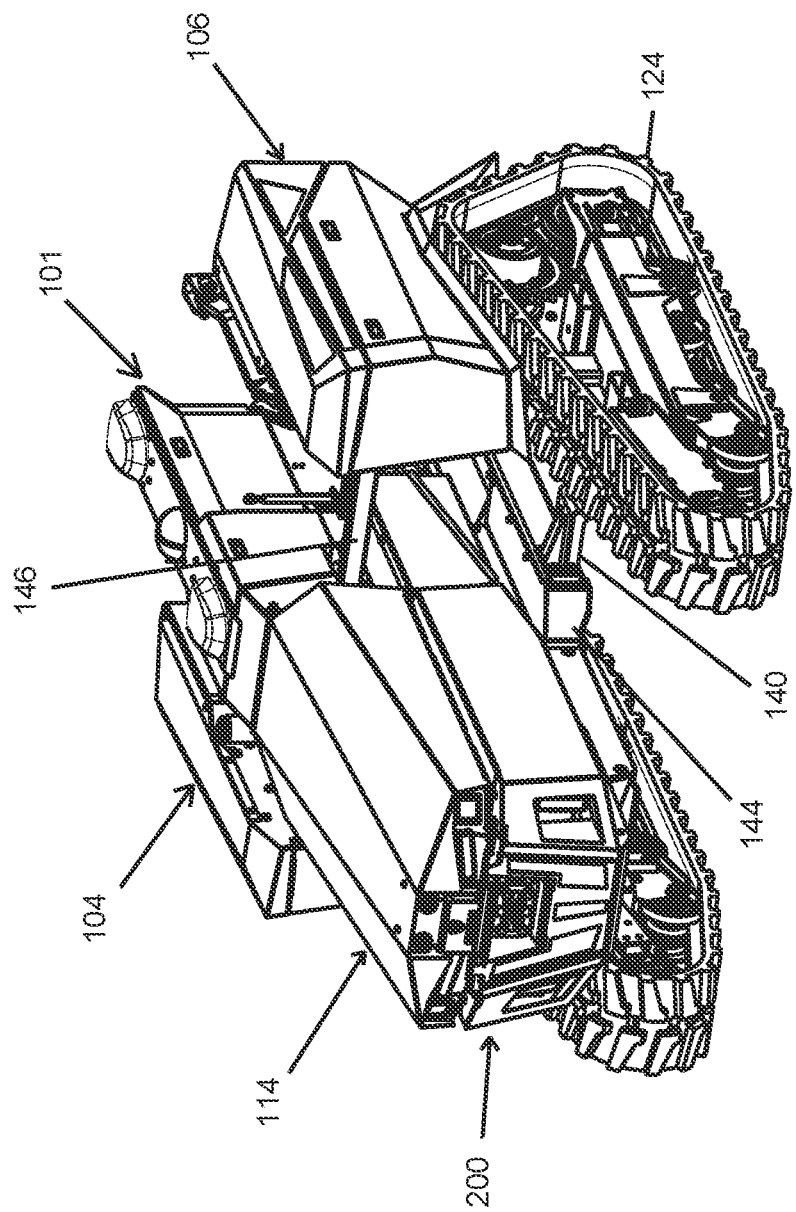
FIG. 6 is an alternative implementation of a robotic vehicle having a wider base and higher ground clearance.
Figure 7:
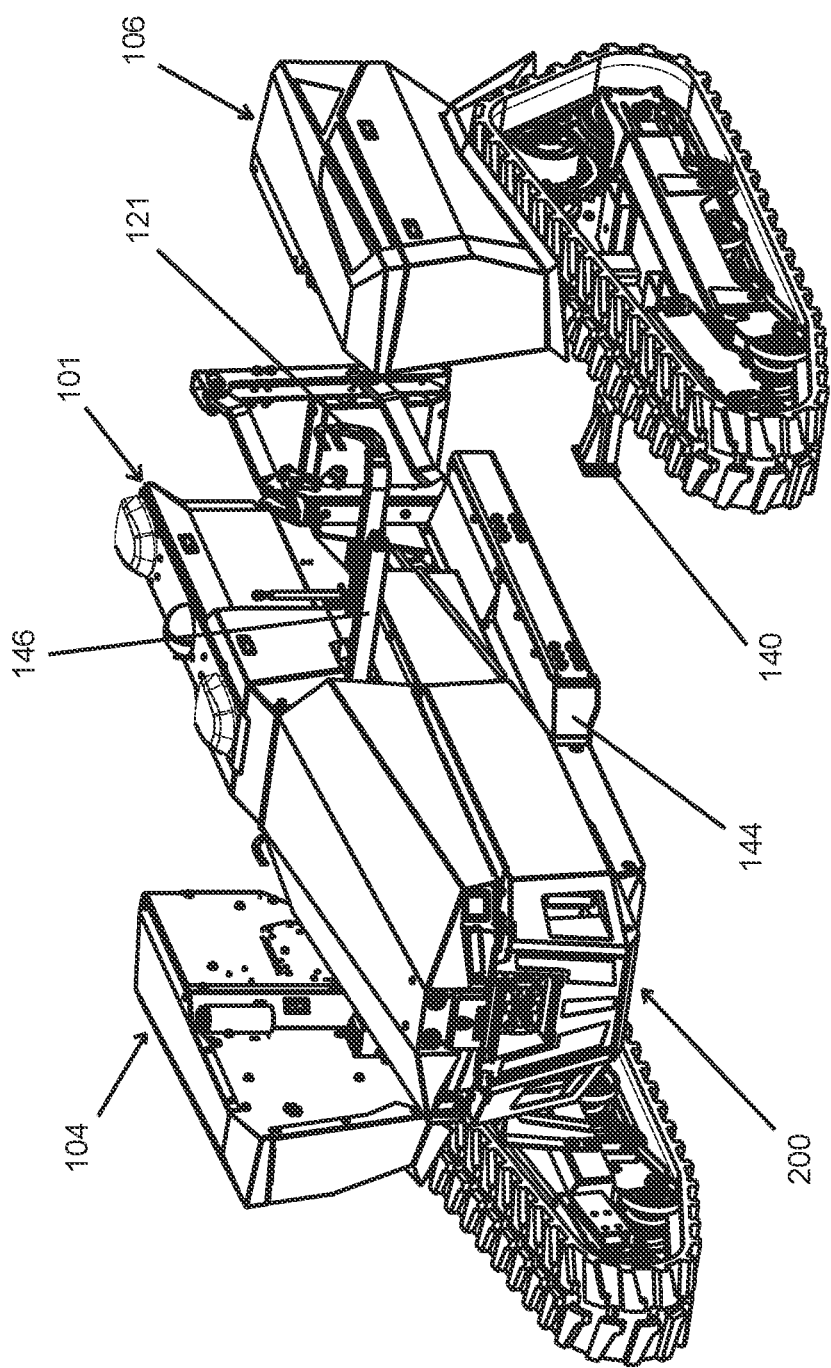
FIG. 7 is a perspective view of the robotic vehicle of FIG. 6 with the track assemblies detached from the operating unit.
Figure 9:
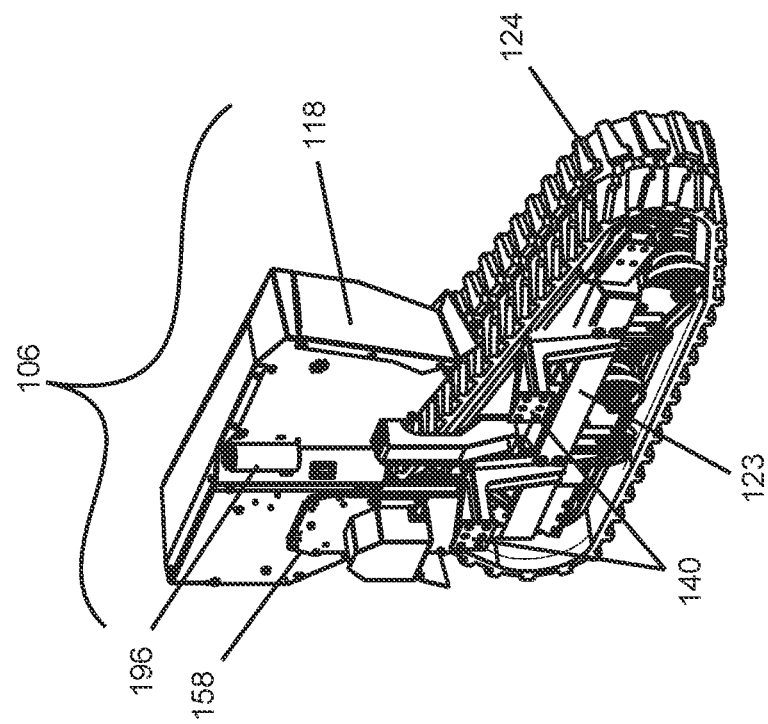
FIG. 9 is a perspective view of the inside of the left track assembly of FIG. 6.
Figure 8:
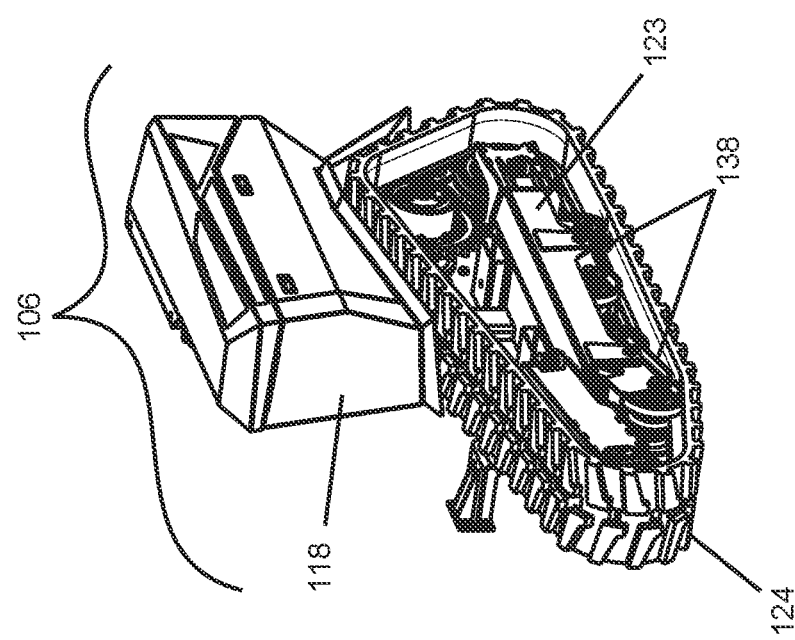
FIG. 8 is a perspective view of the outside of the left track assembly of FIG. 6.

Referring to FIG. 5, left track assembly 106 comprises the standard components of a tracked vehicle, including a track 124 the inside of which has attached thereto a track link 126, which can be in the form of a belt or chain. A sprocket 128 fixed to a final drive 152 (discussed below in connection with FIGS. 10-11) engages track link 126 to drive track 124 across the ground. A front idler roller 130, a rear idler roller 132, and one or more rollers 134 support the weight of robotic vehicle 100 and maintain an alignment of track 124. Front idler roller 130, rear idler roller 132 and rollers 134 are rotationally connected to a track frame 123 by suspension members 138 to absorb some of the shock as robotic vehicle 100 traverses uneven terrain.

Attachment mechanism 120 attaches left track assembly 106 to chassis 102. In the implementation shown in FIG. 4, attachment mechanism is implemented as a pair of tubes 122 connected to a track frame 123 of left track assembly 106 that are urged inward and outward with respect to chassis 102 by at least one actuator 125, shown in FIGS. 17-18. Pair of tubes 122 can each be implemented as a single tube, or multiple telescoping tubes for greater expansion. While an automatic adjustment of the width may be preferred, manually width adjustment with the telescoping tubes is also contemplated. Depending on the terrain being traversed, the track-to-track width can be increased or decreased. This is especially advantageous for use in agricultural operations when distance between crop rows varies, for example, vineyards and produce. Actuator 125 is electrically connected to battery unit 200 and operating unit 112 through electrical connector 121. This way commands from operating unit 112 can expand and retract one of or both right track assembly 104 and left track assembly 106. One end of actuator 125 is fixed to chassis 102 with the rod of actuator 125 fixed to tube 122.

Turning briefly to FIGS. 6-9 and FIG. 19, attachment mechanism 120 can be implemented as a pair of angle arms 140 attached at one end to left track assembly 106 to a track plate 142 that is welded, bolted, otherwise attached longitudinally across track frame 123 of left track assembly 106, and with the other end attached to a chassis plate 144 that is attached longitudinally across chassis 102. A cable cover 146 can be added to cover electrical connector 121 and its corresponding cables. This arrangement of pair of angle arms 140 effectively fixes the track-to-track width of robotic vehicle 100 and elevates the ground clearance of chassis 102. This implementation is useful for operations where a sturdier base and greater ground clearance is required. Otherwise, the embodiment shown in these FIGS. 6-9 is the same as the embodiment shown in FIG. 1. Other implementations of elevating the ground clearance are also envisioned such as angled actuators that effectively elevate central unit 101 and chassis 102 with respect to both right track assembly 104 and left track assembly 106.

Figure 11:
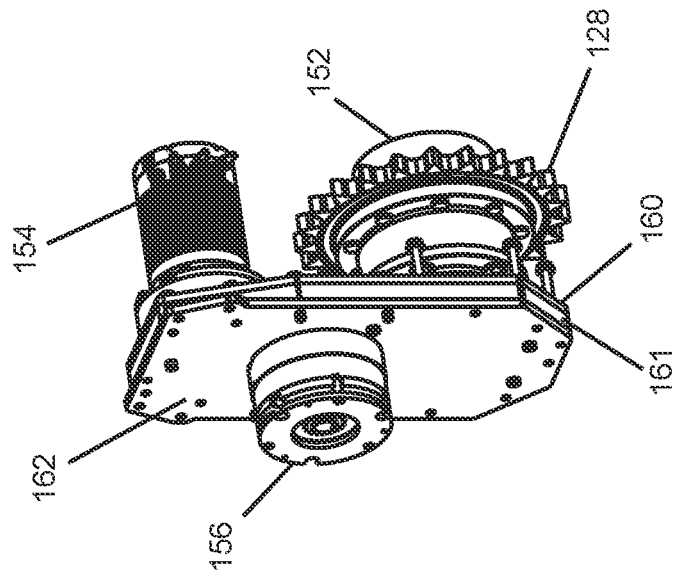
FIG. 11 is a left-side perspective view of the gearbox assembly for the track assembly of the robotic vehicle of FIGS. 1 and 6.
Figure 10:
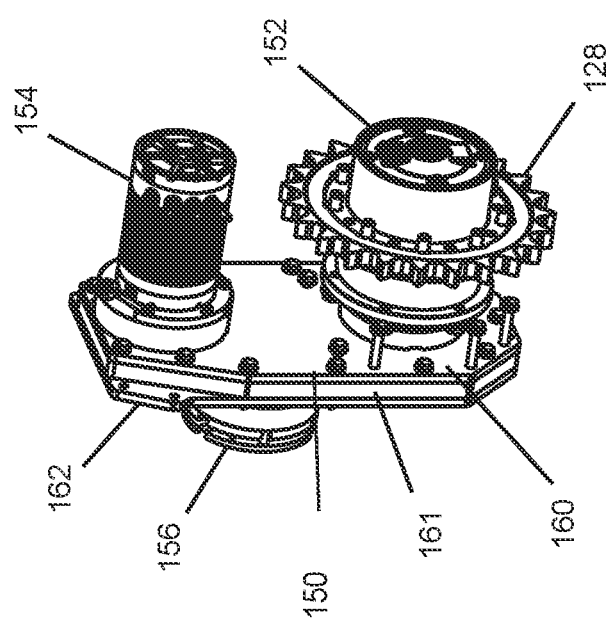
FIG. 10 is a right-side perspective view of the gearbox assembly for the track assembly of the robotic vehicle of FIGS. 1 and 6.

Turning to FIG. 5, shown is an exploded view of left track assembly 106, which further comprises of a gearbox assembly 150 and a coolant system 190. Turning now to FIGS. 10-11, shown is gearbox assembly 150 that drives left track assembly 106. Gearbox assembly 150 comprises of a final drive 152 that is directly connected to sprocket 128 that engages track link 126 of left track assembly 106. Final drive 152 is driven in rotation by a motor 154 that is powered by battery unit 200 and commanded by operating unit 112. A brake 156 is mechanically interfaced between motor 154 and final drive 152 to arrest rotation of motor 154 and final drive 152. All of these components are mechanically connected together in an innovative arrangement with motor 154 being vertically elevated above final drive 152, and with an axis of rotation of an output of motor 154 being above the axis of rotation of final drive 152, which places motor 154 above track 124 of left track assembly 106 to keep it out of the dirt. The mechanical equipment connecting these components together are all isolated inside a narrow, two-inch thick, gear box 158.

Figure 15B:
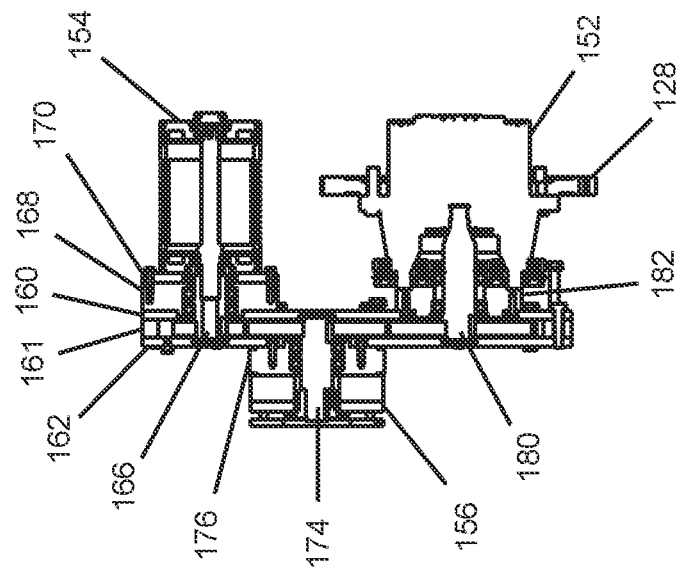
FIG. 15B is a section view taken along the line A-A of FIG. 15B.
Figure 15A:
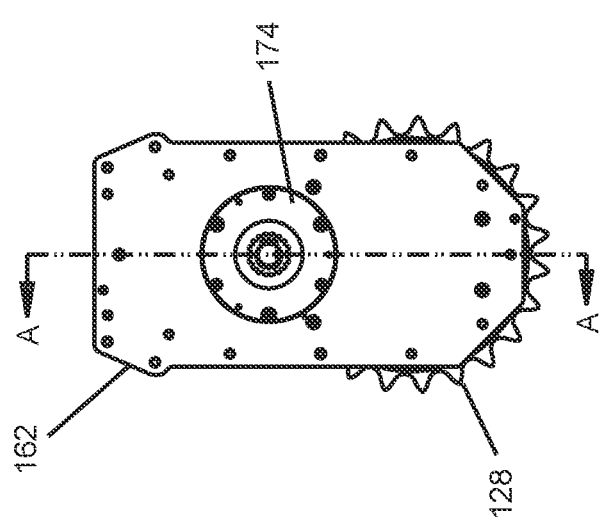
FIG. 15A is a rear view of the gearbox of FIG. 11.
Figure 16:
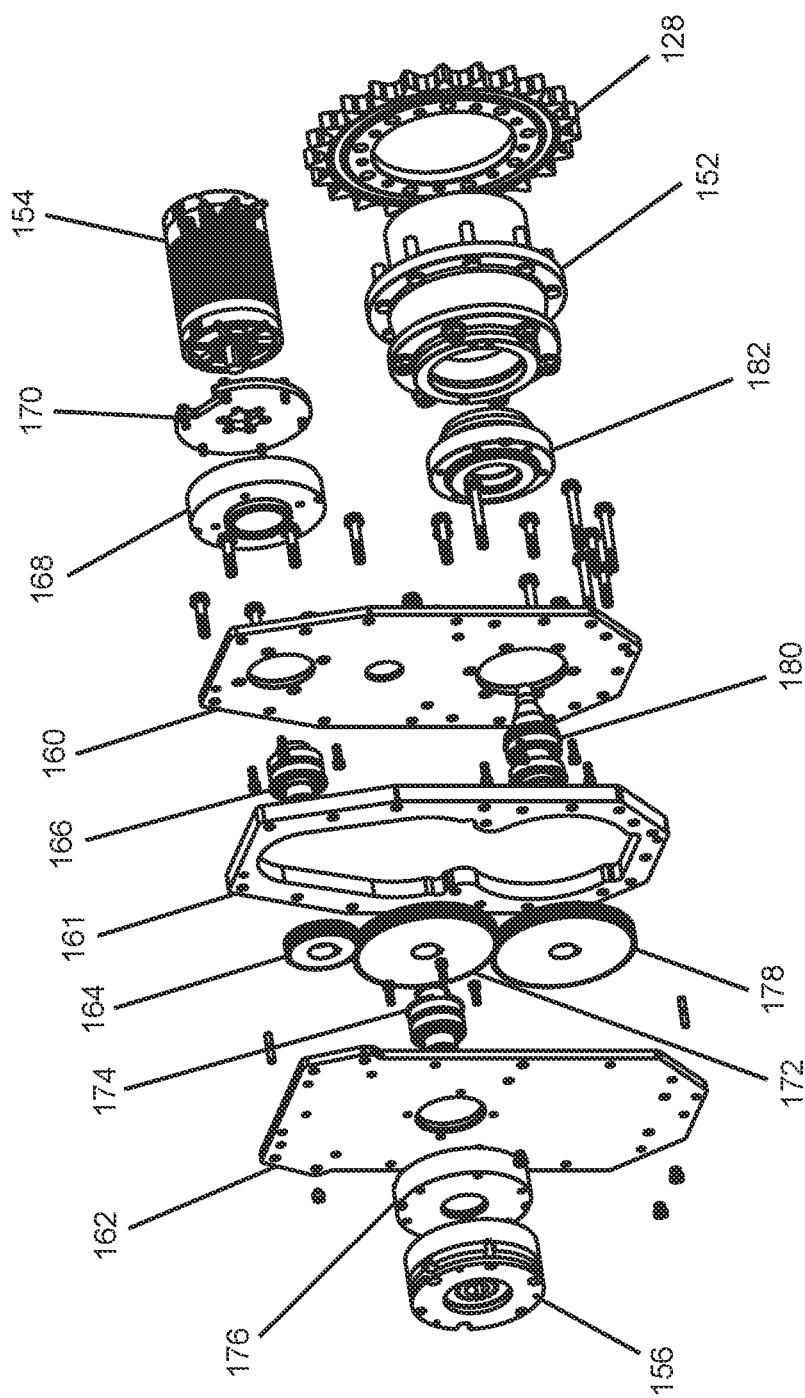
FIG. 16 is an exploded view of the gearbox assembly of FIGS. 10 and 11.
Figure 18:
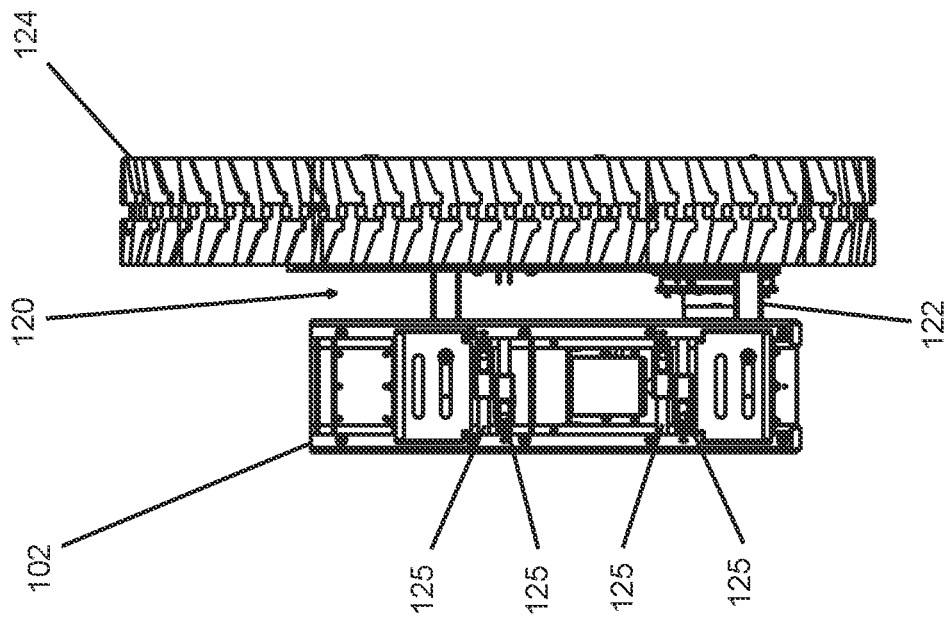
FIG. 18 is a bottom view of the left track assembly and the operating unit of FIG. 2 with the left track assembly extended from the operating unit.
Figure 17:
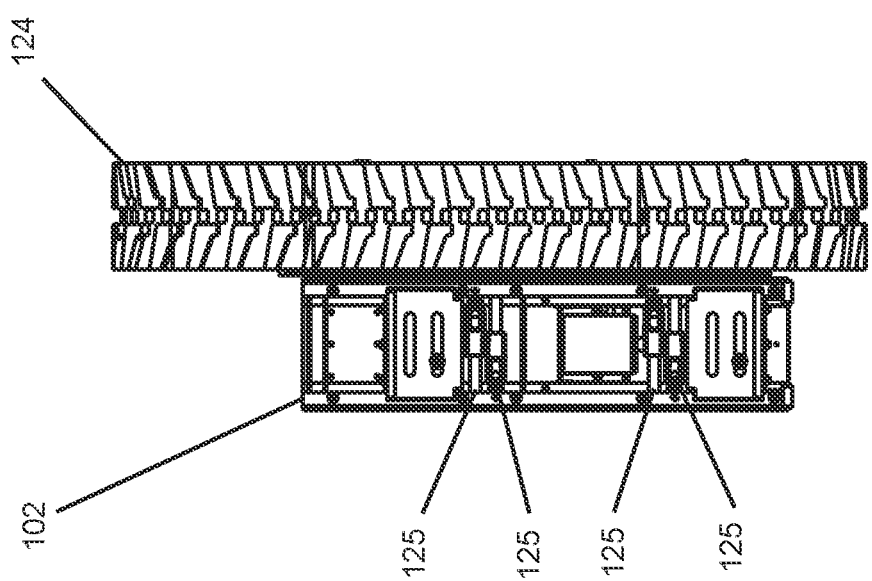
FIG. 17 is a bottom view of the left track assembly and the operating unit of FIG. 1.
Figure 19:
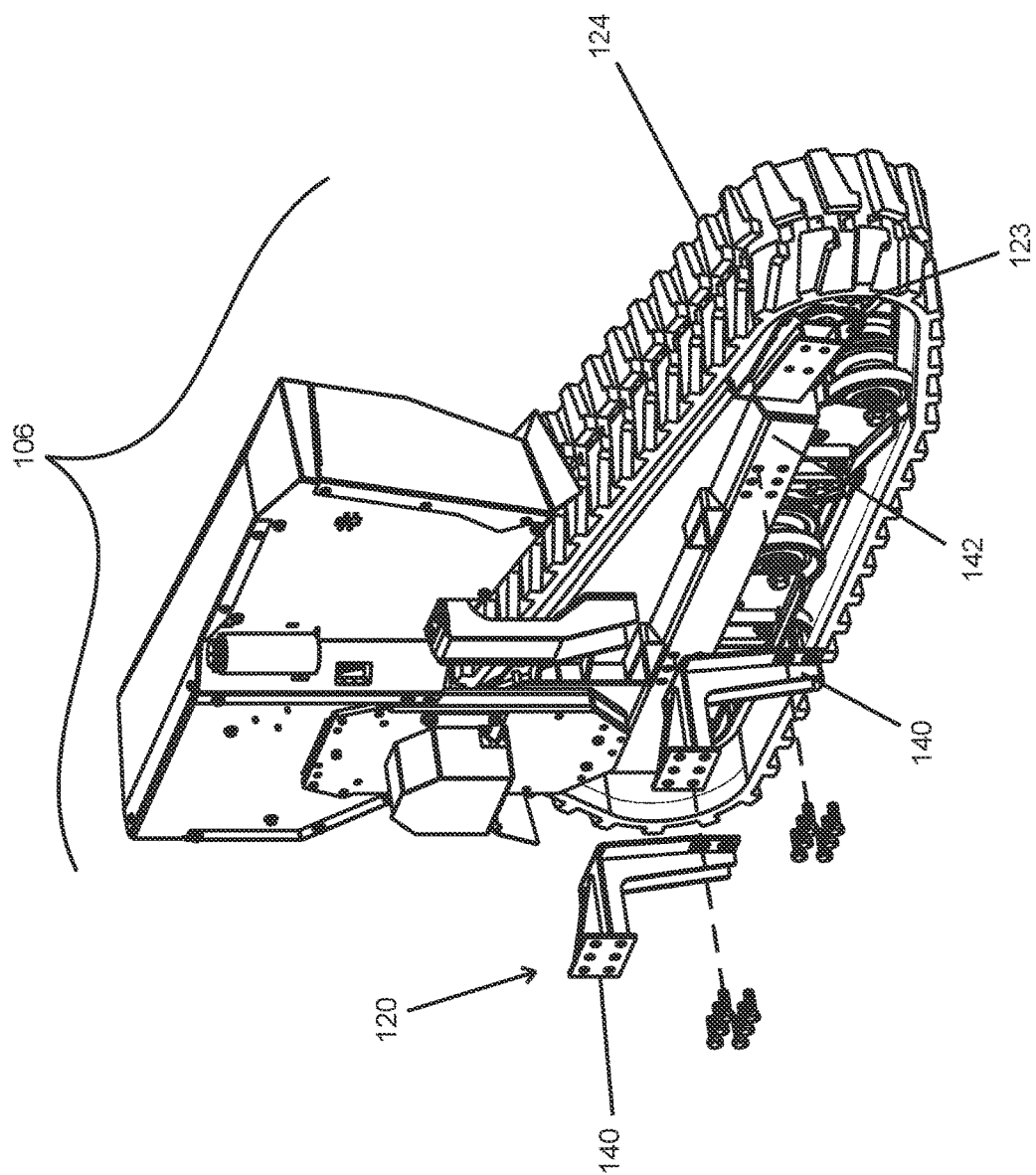
FIG. 19 is a perspective view of the inside of the left track assembly of FIG. 6 with the attachment mechanism exploded from the left track assembly.

Gear box is best illustrated in FIG. 10, which shows a front-side perspective view of gear box 158, FIG. 11, which shows a rear-side perspective view of the same, FIG. 15A, which shows a rear view of the gear box of FIG. 11, and FIG. 15B, which shows a section view taken along the line A-A of FIG. 15B, and FIG. 16, which shows an exploded view of gear box assembly 150. Gearbox 158 comprises of a front gearbox plate 160 and a rear gearbox plate 162 spaced apart by a center gearbox plate 161. Inside gear box 158 is a motor gear 164 that is mechanically connected to motor 154 by a motor shaft assembly 166, which is sealed inside a motor shaft housing 168 and fixed and aligned with motor 154 by a motor attachment plate 170. Motor gear 164 is counter-rotationally engaged with a brake gear 172 that is mechanically connected to brake 156 by a brake shaft assembly 174, which is sealed inside a brake shaft housing 176, fixed, and aligned with motor 154. This allows brake 156 to provide counter-rotational force to brake gear 172 to arrest the rotation of motor gear 164. Brake gear is counter-rotationally engaged to a final drive gear 178 that is mechanically connected to final drive 152 and sprocket 128 by a final drive shaft assembly 180, which is sealed inside a final drive shaft housing, fixed, and aligned with final drive 152.

All of motor gear 164, brake gear 172, and final drive gear 178 have their respective axis aligned on the same vertical plane to narrow the necessary width of gear box 158. This also allows for gear box 158 to have a thickness that is much smaller than standard gearboxes for electrically driven robotic vehicles. Rear gearbox plate 162 also has a large surface area that provides points of attachment for coolant system 190.

Figure 14:
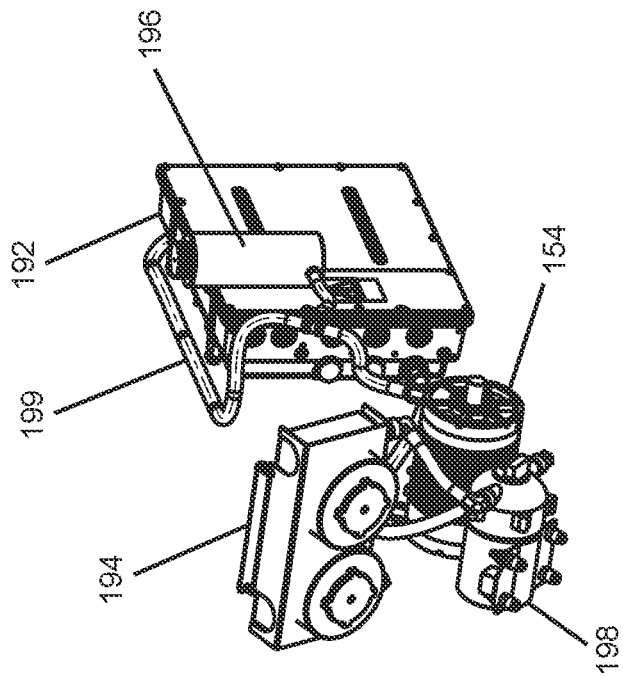
FIG. 14 is a left-side perspective view of the coolant system for the track assembly of the robotic vehicle of FIGS. 1 and 6.
Figure 13:
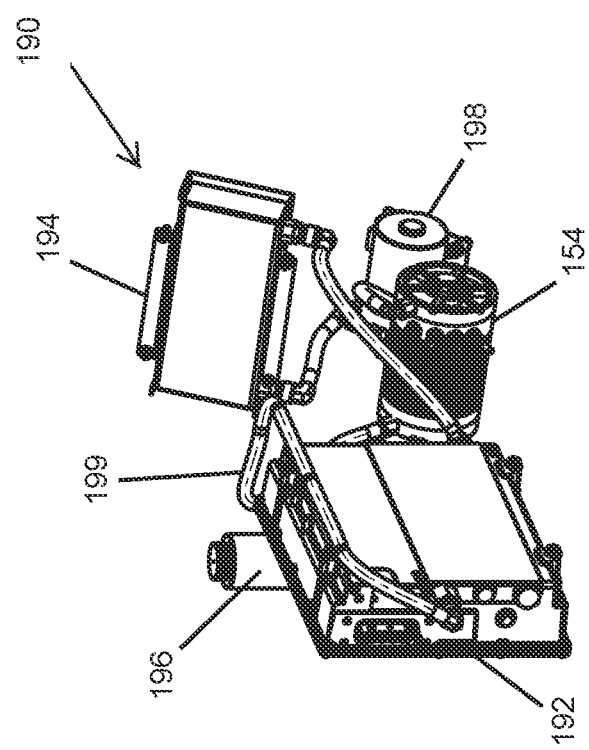
FIG. 13 is a right-side perspective view of the coolant system for the track assembly of the robotic vehicle of FIGS. 1 and 6.
Figure 21:
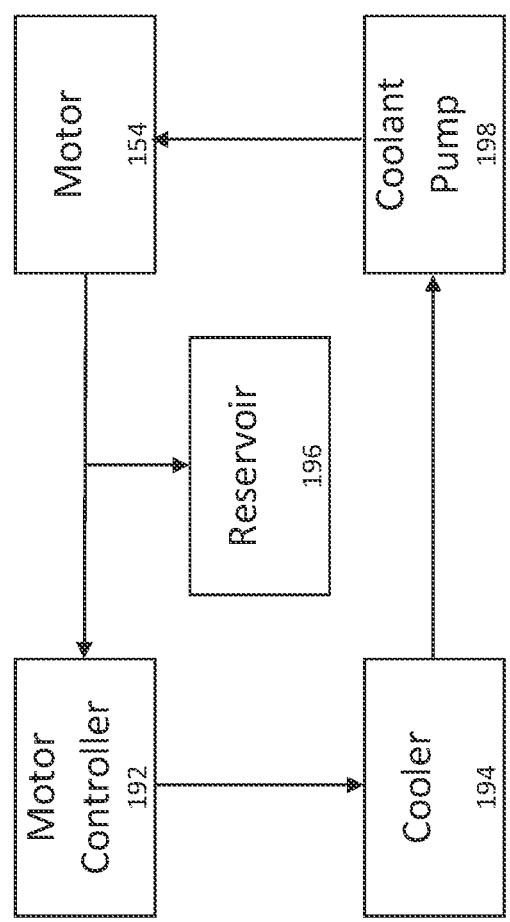
FIG. 21 is a schematic of the coolant system of the robotic vehicle of FIG. 1.

Turning to FIGS. 13-14 and FIG. 21, shown is coolant system 190 connected to motor 154 and a motor controller 192. For motor 154 implemented as an AC motor, motor controller 192 can be implemented as an inverter for converting DC voltage from battery unit 200 to a variable frequency AC power to drive motor 154. For motor 154 implemented as a DC motor, motor controller 192 can control the rotational speed and torque of motor 154 by regulating the current and voltage applied to motor 154. In both instance, motor 154 and motor controller 192 may be cooled to remain in optimal operating conditions. Cooling system 190 comprises of cooler 194 with a built in fan that is in fluid communication with a coolant reservoir 196 and a pump 198. Through a series of hoses 199, pump 198 circulates coolant from coolant reservoir around motor 154 and motor controller 192 to cooler 194 where excess heat can be dissipated. Returning to FIG. 5, it will be noticed that cooler 194 with its built in fan is uniquely positioned near the rear of robotic vehicle 100 behind gearbox assembly 150.

Returning to FIGS. 1-4, it can be seen that left track assembly 106 is a self-contained unit with gear box assembly 150, coolant system 190, motor 154, and motor controller 192 being self-contained in an ornamental cover 118 above track 124 of left track assembly 106. Cover 118 can comprise an outside cover section 118a and an inside cover section 118b which can be directly connected to gear box 158. This allows one or more left track assemblies 106 to be added or removed by merely disconnecting electrical connector 121 and attachment mechanism 120.

Figure 20:
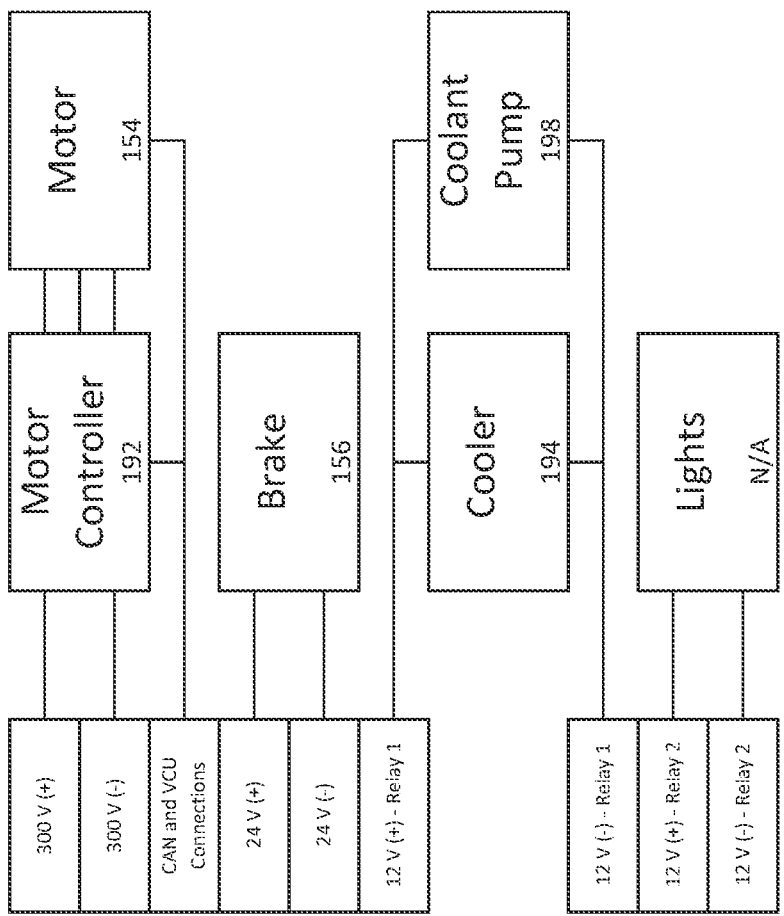
FIG. 20 is an electrical schematic of the robotic vehicle of FIG. 1.

FIG. 20 shows a high-level electrical schematic for robotic vehicle 100. Central unit 101 of robotic vehicle 100 comprises of battery unit 200 that is electrically connected to operating unit 112, which contains the software and hardware necessary to drive and control robotic vehicle 100. Each right track assembly 104 and left track assembly 106 is electrically connected to operating unit 112 and battery unit 200 by at least one electrical connector 121. Power from battery unit 200 and bi-directional control and response signals from operating unit 112 are therefore supplied directly to motor controller 192, actuator 125, pump 198 and cooler 194. All of the positive and negative DC supply voltages, the relays supplies, and the bi-directional CAN and VCU connections for the bi-directional control and response signals between operating unit 112 and motor 154 and motor controller 192 can be electrically connected by at least one electrical connector 121 between operating unit 112 and the respective right track assembly 104 and left track assembly 106. Operating unit 112 is configured to control simultaneously all of the track assemblies 104, 106 described herein.

Those skilled in the art will understand that the illustrated embodiments described above are exemplary. Other changes and modifications to robotic vehicle 100 are contemplated herein. In an alternative implementation, a single motor controller 192 can be positioned in central unit 101 and configured to power motor 154 for left track assembly 106 and right track assembly 104. Similarly, a single coolant system 190 can be positioned in central unit 101 with additional quick release connections of hoses 199. Such modifications provide the modular benefits of the illustrated embodiments, but are presently believed to be dis-advantageous due to the lack of availability or costs of a single motor 192 controller to drive multiple motors 154.

Terms used herein are presumed to have their ordinary meaning to those skilled in the art unless a different meaning is given. Substantially, as used herein, is defined to have a standard dictionary definition of being largely but not wholly that which is specified.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A robotic vehicle, comprising:
a chassis comprising a right side and a left side;
a right track assembly separable from the right side of the chassis;
a left track assembly separable from the left side of the chassis; and
wherein each of the right track assembly and the left track assembly comprises a motor operably connected to a track, a final drive, a brake to arrest the rotation of an output of the motor, and a gear box assembly that connects the motor vertically above the final drive, wherein an axis of rotation for the output of the motor is positioned above an axis of rotation of the final drive.

2. The robotic vehicle of claim 1, wherein each of the right track assembly and the left track assembly further comprises:
a track frame;
a track link combined to the track to rotate with the track;
a sprocket engaged with the track link to rotate the track link and the track;
at least one idler roller and at least one roller engaged with the track link to maintain an alignment of the track; and
the final drive is combined to the sprocket and driven by the motor to rotate the track with respect to the track frame.

3. The robotic vehicle of claim 1, wherein each gear box assembly further comprises a gear box for housing a motor gear mechanically coupled to the motor, a brake gear mechanically coupled to the brake and counter-rotationally engaged with the motor gear, and final drive gear mechanically coupled to the final drive and counter-rotationally engaged with the brake gear, wherein each of the motor gear, the brake gear, and the final drive gear have an axis of rotation all of which are aligned on a vertical plane.

4. The robotic vehicle of claim 3, wherein each gear box further comprises of a front gear box plate and a rear gear box plate spaced apart by a center gear box plate, wherein the motor gear is coupled to the motor by a motor shaft assembly that is substantially housed in a motor shaft housing that is attached to the outside of the front gear box plate and to the motor, wherein the brake gear is coupled to the brake by a brake shaft assembly that is substantially housed in a brake shaft housing that is attached to the outside of the rear gear box plate and to the brake, and wherein the final drive gear is coupled to the final drive by a final drive shaft assembly that is housed in a final drive shaft housing that is attached to the outside of the front gear box face and to the final drive.

5. The robotic vehicle of claim 1, wherein each of the right track assembly and the left track assembly further comprises a coolant system operably connected to a motor controller and the motor for dissipating heat from the motor controller and the motor, wherein the coolant system comprises of a cooler and a pump for circulating coolant around the controller and the motor to the cooler, and wherein the controller is positioned between the motor and the pump.

6. The robotic vehicle of claim 1, wherein each of the right track assembly and the left track assembly further comprises a track frame and an attachment mechanism to removably attach the track frame to the chassis.

7. The robotic vehicle of claim 6, wherein each attachment mechanism further comprises a pair of tubes combined to the track frame and slidingly combined to the chassis, and an actuator combined to the chassis and attached to at least one tube of the pair of tubes to drive the track frame towards and away from the chassis to increase or decrease a track-to-track width of the robotic vehicle.

8. The robotic vehicle of claim 6, wherein each attachment mechanism further comprises a pair of angle arms attached at one end to the track frame and attached at another end to the chassis to elevate the chassis above the ground and increase a track-to-track width of the robotic vehicle.

9. A robotic vehicle, comprising:
a chassis comprising a right side and a left side;
a right track assembly separable from the right side of the chassis;
a left track assembly separable from the left side of the chassis; and wherein each of the right track assembly and the left track assembly comprises a motor operably connected to a track through a final drive, a brake to arrest the rotation of the output of the motor, and a gear box assembly that connects the motor to the brake both of which are connected vertically above the final drive, wherein an axis of rotation for an output of the motor is positioned above an axis of rotation of the final drive, a motor controller electrically connectable to a battery unit and electrically connected to the motor for converting power from the battery unit to power for the motor, and wherein the left track assembly is separable from the chassis by an attachment mechanism and an electrical connector with the motor and the motor controller being fully separable with the left track assembly from a central unit comprising an operating unit and the battery unit combined to the chassis.

10. The robotic vehicle of claim 9, wherein each motor is an AC motor and each motor controller converts power from the battery unit to a variable frequency AC power for the motor.

11. A robotic vehicle, comprising:
a chassis comprising a right side and a left side;
a right track assembly separable from the right side of the chassis;
a left track assembly separable from the left side of the chassis; and
wherein each of the right track assembly and the left track assembly comprise a motor operably connected to a track, wherein each of the right track assembly and the left track assembly further comprises a coolant system operably connected to a motor controller and the motor for dissipating heat from the motor controller and the motor, wherein the coolant system comprises of a cooler and a pump for circulating coolant around the controller and the motor to the cooler, and wherein the controller is positioned between the motor and the pump.

12. The robotic vehicle of claim 11, wherein each coolant system and each motor controller are positioned above the track.

13. The robotic vehicle of claim 12, wherein each cooler is positioned rearward of the corresponding motor, and a final drive is combined to an output of each motor.

14. A robotic vehicle, comprising:
a chassis comprising a right side and a left side;
a right track assembly separable from the right side of the chassis;
a left track assembly separable from the left side of the chassis; and
wherein each of the right track assembly and the left track assembly comprises a motor operably connected to a track, wherein the left track assembly: (i) is separable from the chassis by an attachment mechanism and an electrical connector with the motor, a motor controller, and a coolant system being fully separable with the left track assembly from a central unit comprising an operating unit and a battery unit combined to the chassis; and (ii) wherein an ornamental cover is positioned above the track with the motor, the motor controller, and the coolant system being enclosed in the ornamental cover all of which is positioned above the track and with a cooler of the coolant system being positioned rearward of the motor and the motor controller with respect to the front of the robotic vehicle, and a gear box connected outside the ornamental cover on the inside of the left track assembly to couple the motor to a final drive that drives the track with the motor being positioned above the final drive with a rotational axis of the output of the motor being vertically aligned and on the same plane with a rotational axis of the output of the final drive.

15. A robotic vehicle, comprising:
a chassis comprising a right side and a left side;
an operating unit positioned rearward on the chassis;
a battery unit positioned forward on the chassis;
a right track assembly separable from the right side of the chassis;
a left track assembly separable from the left side of the chassis;
wherein each of the left track assembly and the right track assembly is separable from the chassis by an attachment mechanism and an electrical connector, and wherein each of the right track assembly and the left track assembly further comprises:
a motor operably attachable to the battery unit on the chassis, a final drive connected to the motor, a brake to arrest the rotation of an output of the motor, and a gear box assembly that connects the motor to the brake both of which are connected vertically above the final drive;
a motor controller electrically connectable to the battery unit and electrically connected to the motor for converting power from the battery unit to power for the motor;
a track frame removably attachable to the chassis;
a track rotatable across the ground and with respect to the track frame;
a track link combined to the track to rotate with the track;
a sprocket connected to the motor and engaged with the track link to rotate the track link and the track;
at least one idler roller and at least one roller engaged with the track link to maintain an alignment of the track; and
wherein the motor and the motor controller being fully separable with the left track assembly from the operating unit and the battery unit.

16. A robotic vehicle, comprising:
a chassis comprising a right side and a left side;
an operating unit positioned rearward on the chassis;
a battery unit positioned forward on the chassis;
a right track assembly separable from the right side of the chassis;
a left track assembly separable from the left side of the chassis;
wherein each of the left track assembly and the right track assembly is separable from the chassis by an attachment mechanism and an electrical connector, and wherein each of the right track assembly and the left track assembly further comprises:
a motor operably attachable to the battery unit on the chassis;
a track frame removably attachable to the chassis;
a track rotatable across the ground and with respect to the track frame;
a track link combined to the track to rotate with the track;
a sprocket connected to the motor and engaged with the track link to rotate the track link and the track; and
at least one idler roller and at least one roller engaged with the track link to maintain an alignment of the track;

wherein the motor being fully separable with the left track assembly from the operating unit and the battery unit, wherein each of the right track assembly and the left track assembly further comprises a gear box assembly comprising the motor positioned vertically above and engaging a final drive that is coupled to the sprocket, wherein an axis of rotation for an output of the motor is positioned above an axis of rotation of the final drive to elevate the motor above the ground to keep the motor out of dirt, and wherein the gear box assembly further comprises a brake to arrest the rotation of the output of the motor, and wherein the gear box assembly further comprises a gear box for housing a motor gear mechanically coupled to the motor, a brake gear mechanically coupled to the brake and counter-rotationally engaged with the motor gear, and final drive gear mechanically coupled to the final drive and counter-rotationally engaged with the brake gear, wherein each of the motor gear, the brake gear, and the final drive gear have an axis of rotation all of which are aligned on a vertical plane, and wherein the gear box further comprises of a front gear box plate and a rear gear box plate spaced apart by a center gear box plate, wherein the motor gear is coupled to the motor by a motor shaft assembly that is substantially housed in a motor shaft housing that is attached to the outside of the front gear box plate and to the motor, wherein the brake gear is coupled to the brake by a brake shaft assembly that is substantially housed in a brake shaft housing that is attached to the outside of the rear gear box plate and to the brake, and wherein the final drive gear is coupled to the final drive by a final drive shaft assembly that is housed in a final drive shaft housing that is attached to the outside of the front gear box face and to the final drive.

17. A robotic vehicle, comprising:
a chassis comprising a right side and a left side;
an operating unit positioned rearward on the chassis;
a battery unit positioned forward on the chassis;
a right track assembly separable from the right side of the chassis;
a left track assembly separable from the left side of the chassis;
wherein each of the left track assembly and the right track assembly is separable from the chassis by an attachment mechanism and an electrical connector, and wherein each of the right track assembly and the left track assembly further comprises:
  a motor operably attachable to the battery unit on the chassis;
  a track frame removably attachable to the chassis;
  a track rotatable across the ground and with respect to the track frame;
  a track link combined to the track to rotate with the track;
  a sprocket connected to the motor and engaged with the track link to rotate the track link and the track;
  at least one idler roller and at least one roller engaged with the track link to maintain an alignment of the track; and
wherein the motor being fully separable with the left track assembly from the operating unit and the battery unit, wherein each of the right track assembly and the left track assembly further comprises a motor controller electrically connectable to a battery unit and electrically connected to the motor for converting power from the battery unit to power for the motor, wherein each of the right track assembly and the left track assembly further comprises a coolant system operably connected to the motor controller and the motor for dissipating heat from the motor controller and the motor, wherein the coolant system comprises of a cooler and a pump for circulating coolant around the controller and the motor to the cooler, and wherein the controller is positioned between the motor and the pump, and wherein the coolant system and the motor controller are positioned above the track, and further the cooler is positioned rearward of the motor, and a final drive connected to the motor and coupled to the sprocket.

\* \* \* \* \*